Figure 1:
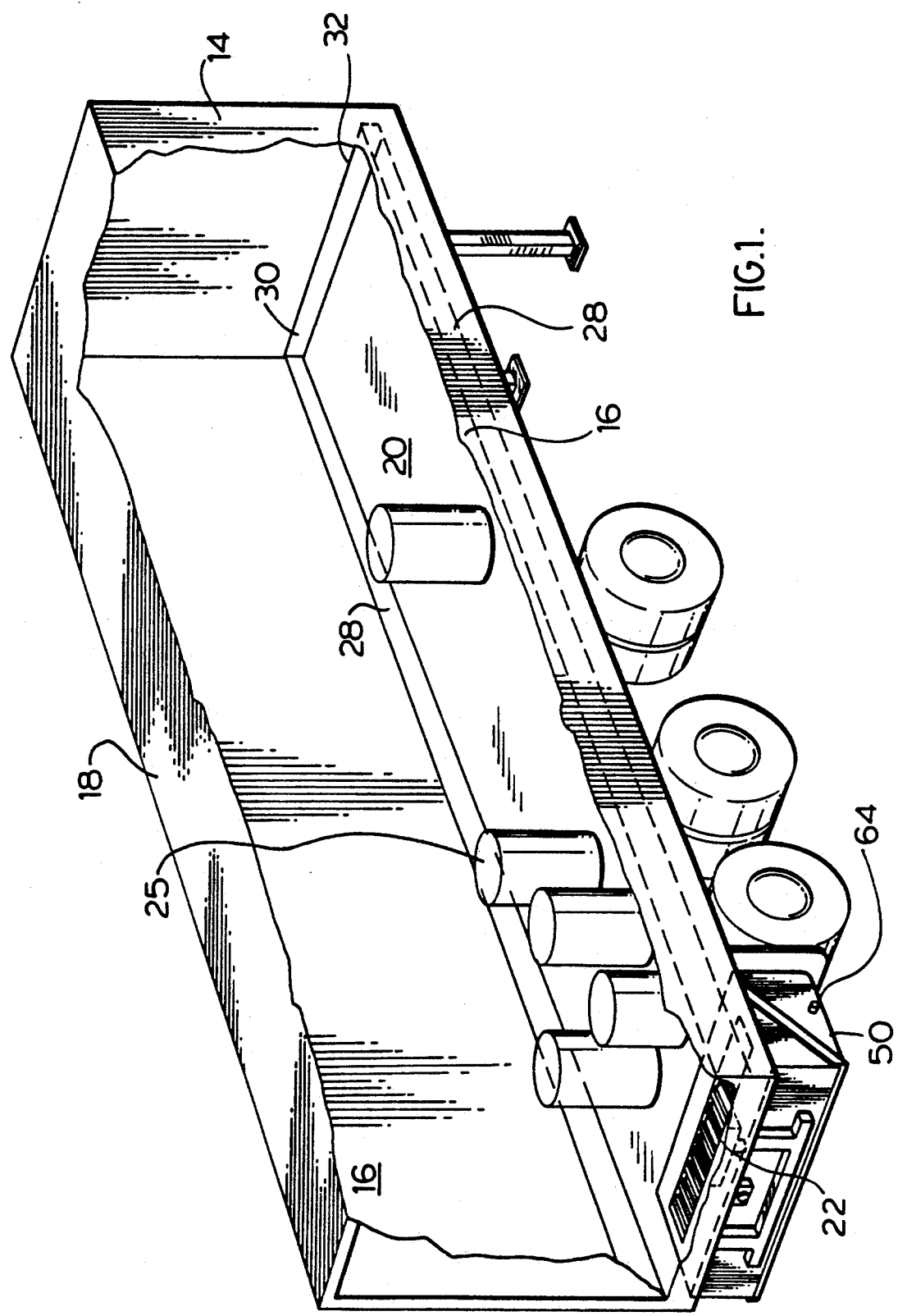

United States Patent [19]
Lockett

[11] Patent Number: 5,271,657
[45] Date of Patent: Dec. 21, 1993

[54] TRUCK OR TRAILER BODY

[75] Inventor: Kenneth R. Lockett, Oakville, Canada

[73] Assignee: Envirovan Limited, Mississauga, Canada

[21] Appl. No.: 5,143

[22] Filed: Jan. 15, 1993

[30] Foreign Application Priority Data

Apr. 27, 1992 [CA] Canada .................................. 2067299

[51] Int. Cl.⁵ ................................................ B60R 7/04
[52] U.S. Cl. .................................... 296/181; 296/37.14;
296/24.1; 280/830; 137/321
[58] Field of Search ..................... 296/182, 204, 24.1,
296/25, 37.14, 181, 183; 280/830, 832, 837, 838,
839; 137/312

[56] References Cited

U.S. PATENT DOCUMENTS

| | | | |
|---|---|---|---|
| 2,395,039 | 2/1946 | Crosby | 296/24.1 X |
| 3,336,069 | 8/1967 | Bayer et al. | 296/24.1 |
| 4,923,237 | 5/1990 | Kiefer et al. | 296/24.1 |
| 5,002,325 | 3/1991 | Fought et al. | 296/37.14 |

Primary Examiner—Robert R. Song

[57] ABSTRACT

A trailer or truck body has a floor sloped toward the rear to an opening and a tank located to receive liquid falling through the opening. A baffle is located between the opening and the main body of the tank and is designed to prevent liquid from splashing back into the body.

16 Claims, 4 Drawing Sheets

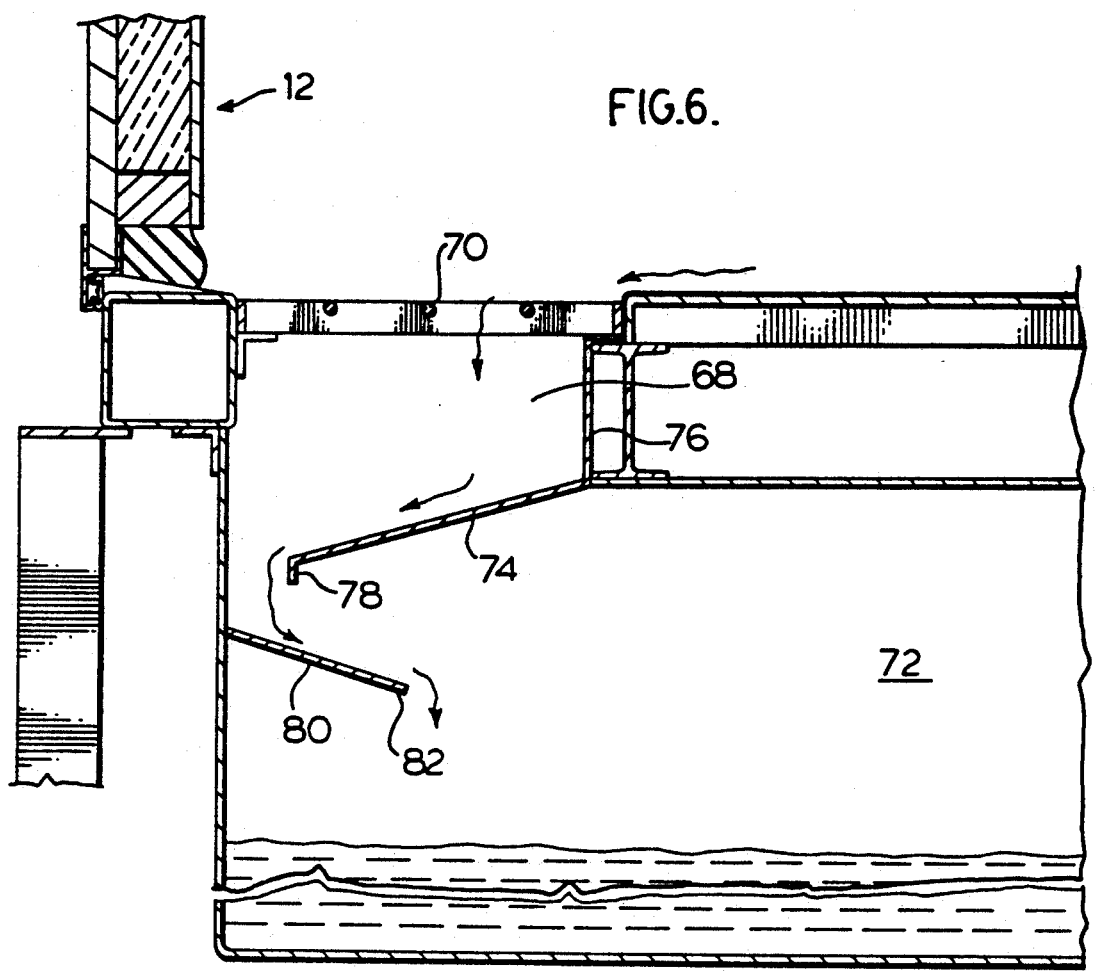
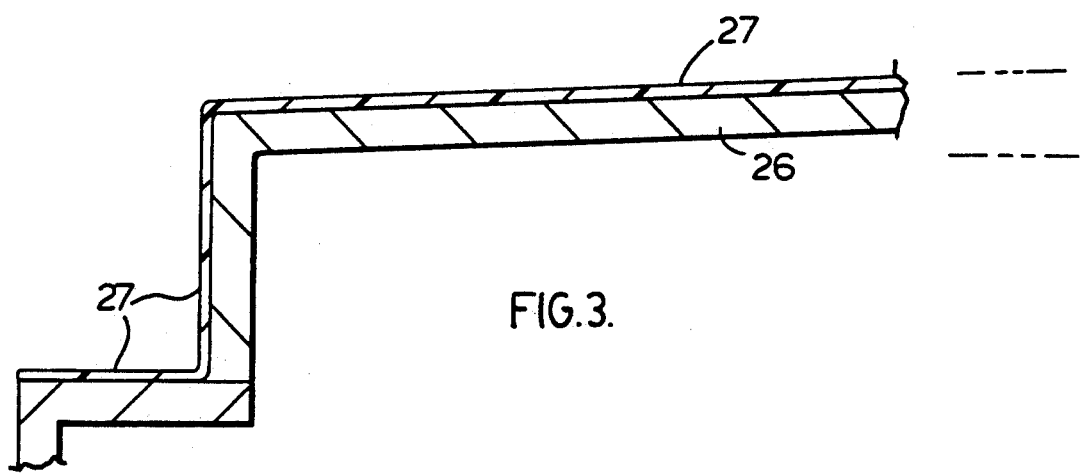

TRUCK OR TRAILER BODY

This invention relates to a trailer or straight truck having a body which is primarily designed for carrying many kinds of waste, hazardous or corrosive liquid materials such as acids whether contained in foods or otherwise, dyes, inks. The body used in the truck or trailer may obviously be used to carry liquids of any kind. By 'liquids' herein I include liquid-containing solids or slurries.

By 'truck' herein is meant a truck with cab engine and cargo body mounted on the same structural frame. Thus, for the purposes of this invention the 'body' is the cargo carrying enclosure of either the truck or trailer.

The trailer having a van type body will exteriorly, be of the large transport type for coupling to a 'tractor' by conventional means including an upper coupling for highway travel. The body of the truck or trailer will contain conventional liquid containers such as steel drums, or plastic containers or bags. The spillage or leakage from such conventional liquid containers is to be handled by collector tanks and other features in accord with the invention.

The invention is concerned with a truck or trailer body specially adapted to carry liquid materials. Such liquid materials will typically be contained in conventional liquid containers within the trailer. Such containers will be sealed and have their own filling or emptying materials. However such containers may leak or spills may occur during filling or emptying. This invention provides a truck or trailer body specially designed to safely contain such leakage or spilling.

The invention provides a body which has bottom side, end and top walls. The body will also have rear doors for which, although sealing is provided, it is not sealing in accord with the invention. The body is preferably constructed so that the floor slopes toward the rear in use (as is conventional with trailer bodies) and is designed to provide a liquid and corrosion proof floor. The rearward end of the floor is provided with an opening, usually a grating, to allow flow herethrough of liquids flowing rearwardly along the floor. A collector tank is located below the opening to receive the liquids flowing through the grating. Baffle means between the opening and the main portion of the tank allow liquids flowing through the opening to reach the tank but interposes a barrier to prevent splashes from such liquids returning up through the grating. The baffle system preferably comprises a basin located to receive liquids flowing downwardly through the opening and a baffle system between the basin and the tank, being a pipe having an upper opening at the floor of the basin and its lower opening in the tank. Preferably the lower end of the pipe is below the upper wall of the tank where the pipe enters to further improve the baffling action against backsplash.

Preferably the collector tank is rectilinear and the pipe from the basin has its lower opening below the upper wall.

The body further is designed with a floor having a coating which is a corrosion resistant and non reactive to acid spills. The coating is preferably one or more layers of epoxy.

By 'epoxy' herein is meant industrial epoxy.

By 'anti-corrosion' or 'corrosion proof' is included non reactive to acid spills.

The side and front end walls are adapted to provide with the floor a 'bath' construction, that is the floor is joined in a liquid proof manner to lower extents of the inner side walls and the inner front end wall, in all cases up to a predetermined height, with the object of holding, up to such predetermined height, a corrosion proof wall on the floor continuing centre the side and front walls up to said height to provide a 'bath' construction. Thus the floor, lower front and lower side wall extents, if metal are respectively connected into, respectively, continuous sheets by welding, or otherwise sealed and floor sections are at their front and side edges welded or otherwise sealed to the lower side edges of the front and side sections whose meeting edges are welded or otherwise sealed to each other. The bath construction reduces leakage and damage to the body liquids escaped from or outside the liquid containers until they have reached the collector tank and facilitates the cleaning of the body between loads.

The invention as described in the previous paragraph preferably has an epoxy anti corrosion coating (preferably on the upper surface of the floor which may be of any material and on the lower extents of the side and front walls). The epoxy coating protects the floor and wall extents, seals at the welds and at the junctions between floor and wall extents.

The preferred floor opening is connected with the collector tank by the basin and connecting pipe described.

A less preferred method of connecting the floor opening with the collector tank is to provide a passage between opening and tank and to provide a first baffle wall sloping downwardly from one side of the passage to an end spaced from the opposite side, and a second baffle wall sloping downwardly from the opposite side, below and spaced from the end of the first baffle wall to an end spaced from said one side.

Preferably the passage is generally rectilinear and the first baffle wall slopes rearwardly from the passage front wall while the second baffle wall slopes forwardly from the passage rear wall.

Figure 2:
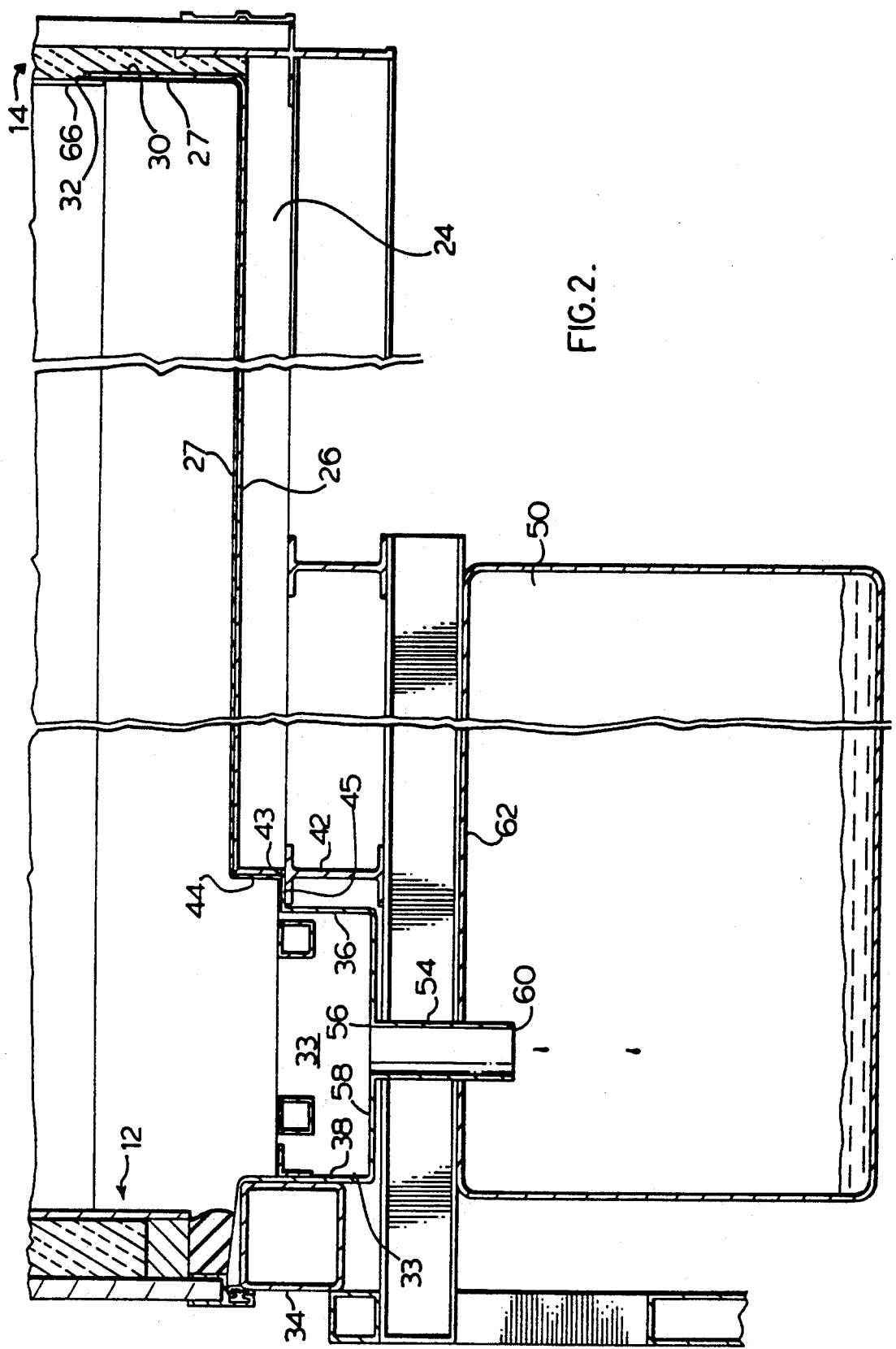
Figure 5:
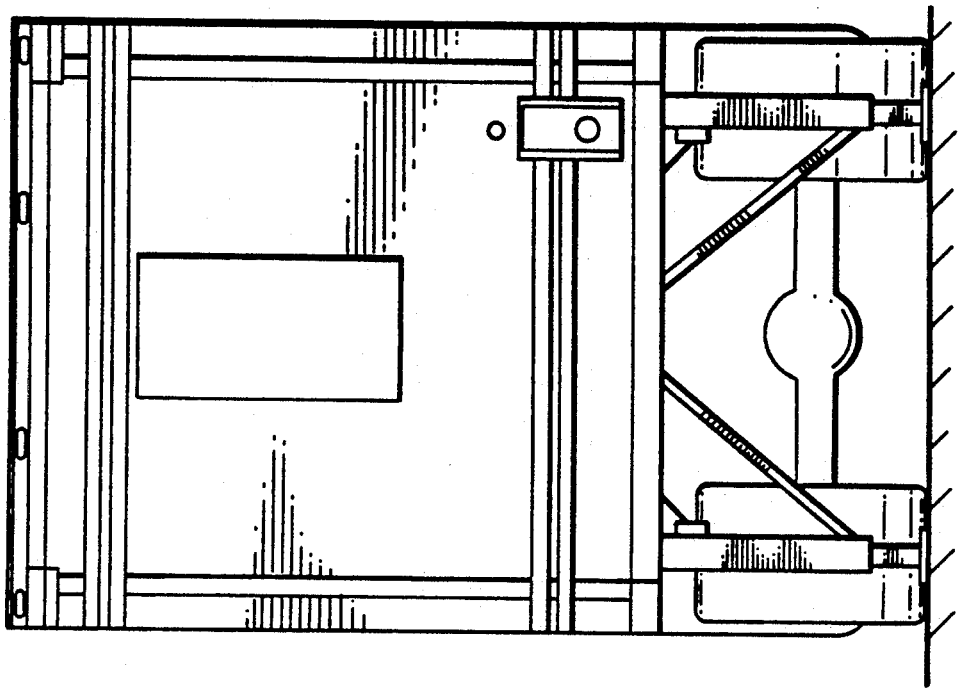
Figure 4:
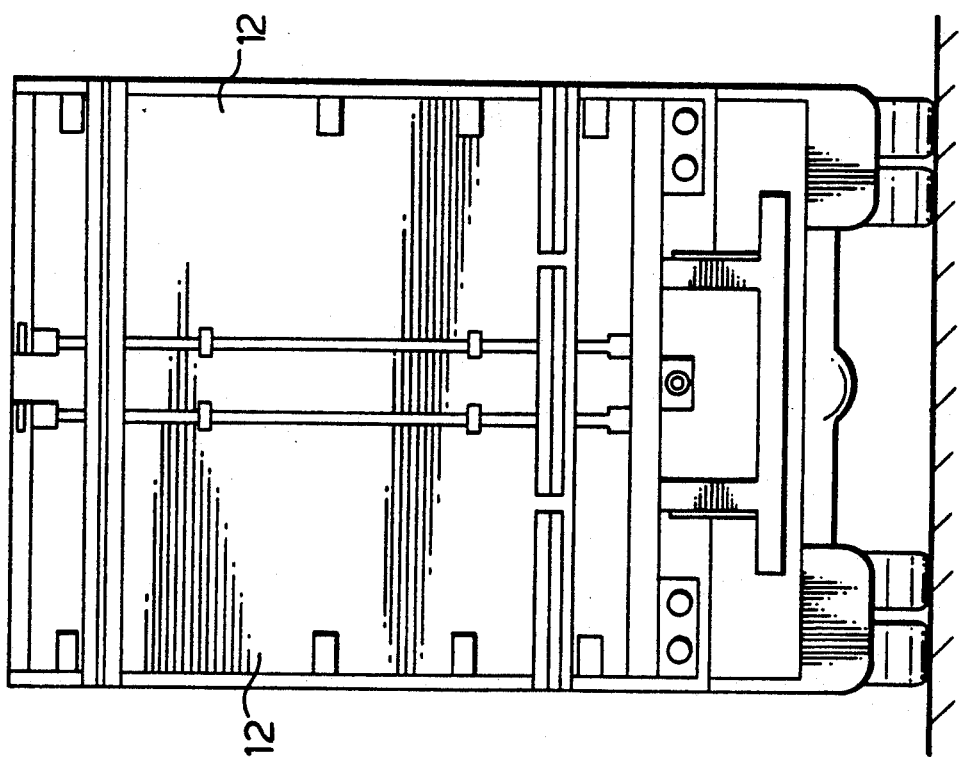

In drawings which illustrate a preferred embodiment of the invention:

FIG. 1 is a broken away perspective view of a trailer body with tank in accord with the invention, FIG. 2 is a vertical section showing the collector tank and basin, FIG. 3 is an enlarged section showing the junction of the body floor with the collector basin, FIGS. 4 and 5 are exterior views of the back and front of a trailer body, and FIG. 6 is a section showing alternate baffle means.

The specific embodiment describes the inventive body as applied to a trailer. It will be understood that, except where otherwise specified the design will be the same for a body mounted on a truck.

In the drawings a trailer will have a body 10 and will be equipped with all the conventional wheels, supports lights, brakes, fittings, couplings none of which are shown or in detail herein or in some cases, at all. The body 10 will conventionally have rearwardly opening doors 12 or roll-up doors whose suspension and opening and closing means forms no part of the present invention.

The inside of the body 10 has front wall 14 side walls 16 roof 18 and floor 20. The body is designed in both the usual stationary attitude or a level surface and in the usual travelling (on a level road) attitude to cause floor 20 to slope rearwardly. The rearward slope of floor 20 is an intrinsic quality of trailers but is utilized by the invention. The floor 20 over some and preferably all of its width stops short of the rearward end of the body interior and in the space between the rear end of the floor and the rear end of the body interior is provided a grating 22 through which liquids on the body floor may pass. The floor has suitable structural flooring 24 (such as of oak) (not shown in detail) supported by the trailer structure which is not shown in detail. Over the oak flooring is an aluminum floor 26 which is coated with a suitable anti corrosion coating 27. Such coating must obviously be selected to be resistent to the particular materials to be carried. However for acids contained in foods the preferred coating comprises two or three coats of a two part epoxy sold under the trade mark CHEMFORD 305 by H. L. Blackford Ltd. of 2323 Royal Windsor Dr., Mississauga, Ontario. The coating 27 is preferably applied in two or three coats and an anti slip ingredient is preferably added to the outer coat.

The floor is continued a predetermined distance (usually about 1-2 feet) up the front and side walls as side extents 28 and front extents 30. The aluminum sheeting of the floor will be welded into one piece and if more than one piece is used the edges must be joined in a liquid tight manner. Similarly the adjacent edges of the side and end extents and any welds between these extents and the bottom must be joined in a liquid tight manner. There is thus provided a 'bath' type construction comprising the floor sheet and the side extents 28 and front extents 30. For the inventive use the bath type surfaces are coated with the anti corrosion coating discussed previously. The anti corrosion coating, independently of the floor seals, forms a continuous leak proof layer over the floor and up the side extents. This continuous layer is provided even if the floor is of another metal or oak and if the floor material differ from that of the side extents. The bath type construction thus, protects the body from liquid escape up to the upper edge 32 of the extents 28 particularly when corrosive liquids from the inner tank or from any other source are running on the floor sheet when the body is at such attitude (whether standing or running) that the corrosive liquid tends to run toward the front or the sides, across the floor.

The corrosive liquids are intended to be contained in inner containers which may be of any shape or form such as the steel drums 25. The containers may be of plastic or may be plastic bags in boxes or of any other form.

The opening of the grating 22 preferably extends the width of the inside box dimensions. If the grating extends a lesser distance, the rearwardly extending floor should be sloped or provided with guides or channels to ensure that all rearwardly flowing liquid flows into the grating.

An upwardly open collector basin 33 of stainless steel is dimensioned and located to receive liquids flowing through the grating. The rearward basin wall 38 is mounted on cross-beam 34 of the trailer structure. The forward wall 36 of the basin makes sealing connection with the floor 26 in any desired manner. Here the forward wall is bent over an I beam 42 of the trailer structure and seated under the lower end 43 of the flange of the metal floor layer 44 which is bent downwardly from the rearward end of metal floor layer 26. The anti corrosive coating 27 for the metal floor is continued unbroken down the rearward side of flange 44, rearward along the upward surface of horizontal flange 45 of the collector basin.

The collector basin and grating are supported in any desired manner on the structural frame of the trailer.

The collector tank 50, is supported in any manner on the structural frame of the truck below the collector basin 33 also of stainless steel and extending forwardly thereof preferably to the vicinity of the trailer rear wheels. The tank 50 is preferably made as large as possible, given the overall construction of the trailer, extending (with the grating and collector basin, the width of the trailer). The tank is preferably defined by rectilinear walls. A connecting conduit 54 is provided between the collector basin and the collector tank. Such conduit has an upper end 56 opening into and flush with the lower wall 58 of the collector basin. The lower end 60 of conduit 54 is open and located below the upper wall 62 of the collector tank and the narrow passage of the conduit 54 itself, which features together effectively prevent backsplash from the collector tank 50 into the collector basin 33 and the trailer.

Backsplash is to be prevented because liquid loose on the trailer bottom provides an erratic shifting of the trailer load and a hazard to operation of truck and trailor.

The collector is provided with any desired outlet fitting and valving preferably at its rearward lower end and indicated schematically at 64.

The conduit 54 also provides the venting from the collector tank. It will be noted that the venting is to the inside of the body so that fumes from the inside collector tank 50 are kept inside the body until the rear doors are opened.

The rear doors 12 and forward walls 14 are provided with insulation and sealing as shown and may be provided with heating between double walls although this forms no part of the invention. The construction of the side walls will be similar.

As shown the forward wall is provided with a double wall and the lower end of the inner wall 66 of the doublet is overlapped with the upper extent 30 of the forward wall of the bath type construction and sealed thereto with suitable sealing preferably the epoxy coating 27 used to coat the floor. Such double wall and overlap is similarly provided on the side walls. Thus the coating 27 on floor 26 runs up extents 30 and 28 and seals to the inner layer 66 of the side wall.

In operation, with the inner tanks filled or partially filled, any liquid leaking or spilling is received on the floor. During forward or sideward tilts of the floor the liquid flows about in the bath type construction. When the floor tilts rearwardly the liquid may run through the grating, into collector basin 33, through conduit into the tank therebelow. Here it will remain, inhibited from back splashing by the baffle arrangement. When desired the liquid may be removed from the tank through outlet 64 by means not shown.

An alternative baffle arrangement is shown in FIG. 6. In FIG. 6 the collector tank is similar to that previously described. A wide passage 68 with walls preferably of stainless steel preferably of rectilinear section, is attached below the grating 70 and sealed to receive the liquids passing therethrough and the lower end of the passage 68 is connected and sealed to open into the upper end of the collector tank 72. The grating bars 70 are shown extending transversely of the box instead of longitudinally 28 in FIG. 1. These are matters of choice. A baffle means uses a rearwardly downwardly sloping first baffle wall 74 from the forward wall 76 defining the passage. The first baffle wall 74 extends transversely the width of the passage. The lower end of the first baffle wall is spaced from the rearward wall of the passage to allow liquids flowing down the first baffle wall 74 from grating 70 to pass downwardly. The rearward end of the first baffle wall is preferably provided with a short downward extent 78 as shown at its lower end.

Below the first baffle wall a second baffle wall 80 extends between the side walls of the tank and forwardly and downwardly from the rear wall of the tank, beneath and spaced from the rearward and lower extremity 78 of the first baffle wall and somewhat forwardly thereof to forward extremity 82. Thus liquid flowing through grating 70 and the opening falls on the second baffle wall, 80 either directly or off the first baffle. The liquid then flows into the tank. Backsplash of liquid in the tank is prevented by the baffle system just described. The baffle system shown in FIGS. 1–3 is however preferred to that of FIG. 6.

the collector tank may, if described, be provided with a sensor, not shown, to detect the presence of liquid in the tank and signal it to the cab or elsewhere.

The invention has been described with the inventive body mounted on a trailer. It will be understood that the body may instead be mounted on a truck. When the body is to be mounted on a truck, the foregoing description is applicable with the necessary changes that where the reference is made to the trailer structure, it should be read as if reference is made to a truck structure.

The inventive body is placed on a truck or a trailer, if the intrinsic slope of the truck or trailer is not present or sufficient, the slope may be incorporated in the mounting of the body relative to the truck or trailer or in the attitude of the container floor relative to the body itself.

It is preferred to use a tank of about 300 gallons capacity sufficient to hold the entire liquid contents of most conventional containers.

I claim:

1. Trailer or truck body comprising:
   enclosed body including floor, side walls and front wall,
   adapted in use to have the floor sloped downwardly toward the rear,
   an opening at the rear of the floor,
   a tank located at a lower level than said opening,
   baffle means between said opening and the main body of said tank adapted to allow liquid falling through said opening reaching the bottom of the tank and preventing liquid splashing from adjacent the bottom of the tank from reaching said opening.

2. Trailer or truck body as claimed in claim 1 wherein a grating covers said opening.

3. Trailer or truck body as claimed in claim 1 having an anti-corrosion surface on said floor.

4. Trailer or truck body as claimed in claim 3 wherein said anti-corrosion surface is an epoxy coating.

5. Trailer or truck body as claimed in claim 3 wherein the anti-corrosion surface is continued from the floor to the side and front walls up to a predetermined distance from said floor.

6. Trailer or truck body as claimed in claim 4 wherein the anti-corrosion surface is continued from the floor to the side and front walls up to a predetermined distance from said floor.

7. Trailer or truck body as claimed in claim 1 wherein said floor is of metal and continued a predetermined distance up the side and front walls, metal joints being welded together to provide a sealed construction wherein joints in floor, front or side walls or between one and the other are sealed.

8. Trailer or truck body as claimed in claim 1 wherein said baffle means includes: a collector basin located below said grating to receive liquid falling therethrough, a pipe communicating between the bottom of said collector basin and the main body of said tank.

9. A trailer or truck body as claimed in claim 1 wherein said baffle means includes: a collector basin located below said grating to receive liquid falling therethrough, a pipe communicating between the bottom of said collector basin and the main body of said tank and extending to an open end a predetermined distance below the upper wall of said tank at the point of ingress of said pipe.

10. A trailer or truck body as claimed claim 1 wherein said baffle means comprises: a wall-defined passage extending between said opening and the main body of said tank,
    a first baffle sloping downwardly from one side of said passage to an end spaced from the opposite side,
    a second anti splash baffle sloping downwardly from said opposite side, below and spaced from said first baffle end to an end spaced from said one side.

11. A trailer or truck body as claimed claim 1 wherein a first baffle slopes rearwardly from the forward side of a passage and said second baffle slopes forwardly from the rearward side of said passage.

12. Trailer or truck body comprising:
    enclosed body including floor, side walls and front wall,
    an opening at the rear of the floor,
    a tank located at a lower level than said opening,
    baffle means between said opening and the main body of said tank adapted to allow liquid falling through said opening reaching the bottom of the tank and preventing liquid splashing from adjacent the bottom of the tank from reaching said opening.

13. Trailer or truck body as claimed in claim 1 wherein in a grating covers said opening.

14. Trailer or truck body as claimed in claim 1 having an anti-corrosion surface on said floor.

15. Trailer or truck body as claimed in claim 3 wherein said anti-corrosion surface is an epoxy coating.

16. Trailer or truck body as claimed in claim 3 wherein the anti-corrosion surface is continued from the floor to the side and front walls up to a predetermined distance from said floor.

* * * * *